United States Patent
Kaji et al.

(10) Patent No.: US 6,567,764 B2
(45) Date of Patent: May 20, 2003

(54) METHOD AND APPARATUS FOR REGULATING INTERVAL OF SEEDLINGS

(75) Inventors: Masayuki Kaji, Takikawa (JP); Nobuhiro Yamamoto, Takikawa (JP)

(73) Assignee: Circle Tekko Co., Ltd., Hokkaido (JP)

( * ) Notice: Subject to any disclaimer, the term of this patent is extended or adjusted under 35 U.S.C. 154(b) by 38 days.

(21) Appl. No.: 09/778,911

(22) Filed: Feb. 8, 2001

(65) Prior Publication Data

US 2002/0010561 A1 Jan. 24, 2002

(30) Foreign Application Priority Data

Apr. 5, 2000 (JP) ........................................ 2000-103985

(51) Int. Cl.⁷ .............................................. G06F 19/00
(52) U.S. Cl. ........................................ 702/155; 702/94
(58) Field of Search ........................ 702/155; 426/320; 111/105, 1, 86; 428/402; 47/73, 85; 101/33; 364/555

(56) References Cited

U.S. PATENT DOCUMENTS

| | | | | |
|---|---|---|---|---|
| 4,145,980 A | * | 3/1979 | boots | 111/1 |
| 5,402,740 A | * | 4/1995 | Kinoshita et al. | 111/105 |
| 6,120,822 A | * | 9/2000 | Denvir et al. | 426/320 |
| 6,312,174 B1 | * | 11/2001 | Drynkin et al. | 101/35 |

FOREIGN PATENT DOCUMENTS

| | | | |
|---|---|---|---|
| EP | 0 294 712 | * 3/1988 | |
| JP | 7-110168 | 11/1995 | ........... A01C/11/02 |

* cited by examiner

*Primary Examiner*—John Barlow
*Assistant Examiner*—Tung S Lau
(74) *Attorney, Agent, or Firm*—Sughrue Mion, PLLC

(57) ABSTRACT

In a seedling-interval regulation apparatus, the transport interval between two adjacent seedlings successively transported by a variable speed conveyer is calculated by measuring a distance over which the preceding seedling is transported between a point in time when the preceding seedling is detected by a seedling sensor and a point in time when the succeeding seedling is detected by the seedling sensor. The calculated transport interval between the seedlings is compared with the planting interval. When the calculated transport interval coincides with the planting interval, the transport speed of the variable speed conveyer is maintained. When the calculated transport interval does not coincide with the planting interval, the transport speed of the variable speed conveyer is increased or decreased or the variable speed conveyer is stopped, such that the transport interval between two adjacent seedlings becomes equal to the planting interval immediately after the preceding seedling is discharged from the variable speed conveyer.

16 Claims, 16 Drawing Sheets

METHOD AND APPARATUS FOR REGULATING INTERVAL OF SEEDLINGS

BACKGROUND OF THE INVENTION

1. Field of the Invention

The present invention relates to a method and apparatus for regulating to a predetermined value the interval of seedlings to be planted in a field, such as paper-tube seedlings (i.e., soil-encased seedlings grown in soil-packed paper tubes) or plug seedlings (i.e., soil-encased seedlings grown in soil-packed plastic cells).

2. Description of the Related Art

In general, in order to increase commercial value on the market, plants such as beets and other vegetables are desired to be grown to the same or similar sizes. Therefore, when the seedlings of such plants are transplanted to a field, it is important to regulate the interval of the seedlings to a desired interval suitable for the plant; i.e., to a predetermined planting interval.

Japanese Patent Publication (kokoku) No. 7-110168 discloses a conventional seedling-interval regulation apparatus.

As shown in FIG. 16, in the conventional apparatus, two adjacent paper-tube seedlings Pn and Pn+1, among a plurality of paper-tube seedlings P, are transported successively in the vertical direction by upper transport belts 1 and 1' and lower transport belts 2 and 2'. When a pair of seedling sensors 3 and 3' detect the following paper-tube seedling Pn+1 conveyed by the upper transport belts 1 and 1' after the paper-tube seedling Pn has been conveyed to the lower transport belts 2 and 2', the upper transport belts 1 and 1' are stopped temporarily. Subsequently, when a count value obtained from a rotary encoder 5 attached to a planting disk 4 assumes a predetermined value, rotation of the temporarily-stopped upper transport belts 1 and 1' is resumed in order to maintain the interval between the two paper-tube seedlings Pn and Pn+1 at a predetermined planting interval.

The conventional apparatus is designed on the assumption that the interval t between two adjacent paper-tube seedlings Pn and Pn+1 is narrower than a predetermined planting interval. Further, the interval between two adjacent paper-tube seedlings Pn and Pn+1 is increased through temporary stoppage of the upper transport belts 1 and 1', to thereby regulate their transport interval to the predetermined planting interval. Therefore, the conventional apparatus cannot cope with cases in which the paper-tube seedlings Pn and Pn+1 are conveyed at an interval greater than the predetermined planting interval.

Further, since the regulation of the transport interval t is effected through temporal stoppage of the upper transport belts 1 and 1', overall processing efficiency is deteriorated.

SUMMARY OF THE INVENTION

In view of the foregoing, an object of the present invention is to provide a method and apparatus which can accurately regulate the interval of seedlings to a predetermined planting interval in both the case in which two successive seedlings are conveyed at an interval larger than the predetermined planting interval and the case in which two successive seedlings are conveyed at an interval smaller than the predetermined planting interval and which can improve overall planting efficiency.

A seedling-interval regulation method according to the present invention comprises the steps of calculating the transport interval between two adjacent seedlings successively transported by a variable speed conveyer, by measuring a distance over which the preceding seedling is transported between a point in time when the preceding seedling is detected by a seedling sensor and a point in time when the succeeding seedling is detected by the seedling sensor; comparing the calculated transport interval and a predetermined planting interval; maintaining the transport speed of the variable speed conveyer when the calculated transport interval coincides with the predetermined planting interval, and increasing or decreasing the transport speed of the variable speed conveyer or stopping the variable speed conveyer when the calculated transport interval does not coincide with the predetermined planting interval, such that the transport interval between two adjacent seedlings successively transported by the variable speed conveyer becomes equal to the predetermined planting interval immediately after the preceding seedling is discharged from the variable speed conveyer.

A seedling-interval regulation apparatus according to the present invention comprises a variable speed conveyer; seedling-interval calculation means for calculating the transport interval between two adjacent seedlings successively transported by the variable speed conveyer, by measuring a distance over which the preceding seedling is transported between a point in time when the preceding seedling is detected by a seedling sensor and a point in time when the succeeding seedling is detected by the seedling sensor; seedling-interval comparison means for comparing the calculated transport interval between the seedlings and a predetermined planting interval; and transport-speed control means for controlling the transport speed of the variable speed conveyer on the basis of the comparison result such that when the calculated transport interval coincides with the predetermined planting interval, the transport speed of the variable speed conveyer is maintained, and when the calculated transport interval does not coincide with the predetermined planting interval, the transport speed of the variable speed conveyer is increased or decreased or the variable speed conveyer is stopped, such that the transport interval between two adjacent seedlings successively transported by the variable speed conveyer becomes equal to the predetermined planting interval immediately after the preceding seedling is discharged from the variable speed conveyer.

According to the present invention, the transport interval between adjacent seedlings successively transported is regulated through an increase or decrease in the transport speed of the variable speed conveyer or through temporal stoppage of the variable speed conveyer. Accordingly, the transport interval between two adjacent seedlings successively transported can be accurately made the same as the predetermined planting interval, not only when the seedlings are transported at an interval greater than the predetermined planting interval but also when the seedlings are transported at an interval less than the predetermined planting interval.

Further, the regulation of the seedling transport interval can be performed through increasing and decreasing the transport speed of the variable speed conveyer. Therefore, overall planting efficiency can be improved.

In the present invention, the variable speed conveyer may be constituted by a pair of nipping belts, and each seedling is transported by the pair of nipping belts while being nipped between the pair of nipping belts. Alternatively, the variable speed conveyer may be constituted by a reception belt, and each seedling is transported by the reception belt while being placed on the reception belt.

In the present invention, the transport interval between two adjacent seedlings successively transported may be calculated by measuring, by use of a measuring unit, a traveling distance of the variable speed conveyer between a point in time when the preceding seedling is detected by the seedling sensor and a point in time when the succeeding seedling is detected by the seedling sensor.

In the present invention, selection of good seedlings may be performed as follows. Good and defective seedlings are transported in a horizontal orientation by a transport belt; leaf portions of only the good seedlings are nipped between a leaf-portion nipping belt and the transport belt; one of opposite side portions of the transport belt is caused to bend downward to thereby cause only the defective seedlings whose leaf portions are not nipped by the leaf-portion nipping belt to slip down to the outside of a transport path, whereby only the good seedlings are fed toward the variable speed conveyer. In this case, only good seedlings can be fed to the variable speed conveyer.

In this case, the good seedlings remaining on the transport belt without slipping down are preferably caused to come into close contact with each other. Further, a seedling feed roller may be disposed at a transport completion end of the transport belt, and the following control may be performed. When a good seedling which follows a good seedling fed to the seedling feed roller is not in close contact with the later seedling, only the traveling speed of the transport belt is increased while the rotational speed of the seedling feed roller is maintained. Thus, the transport interval of good seedlings fed to the variable speed conveyer can be made substantially constant. Accordingly, vibration in transport interval can be coped with through increasing and decreasing the seedling transport speed of the variable speed conveyer within a narrow range.

Moreover, a plurality of seedling slip-down flaps may be formed at predetermined intervals along one side portion of the transport belt. The seedling slip-down flaps bend downward upon placement of the soil-encased portions of the good and defective seedlings thereon, whereby only the defective seedlings are caused to slip down to the outside of a transport path.

BRIEF DESCRIPTION OF THE DRAWINGS

Various other objects, features and many of the attendant advantages of the present invention will be readily appreciated as the same becomes better understood by reference to the following detailed description of the preferred embodiments when considered in connection with the accompanying drawings, in which.

DESCRIPTION OF THE PREFERRED EMBODIMENTS

Figure 1:
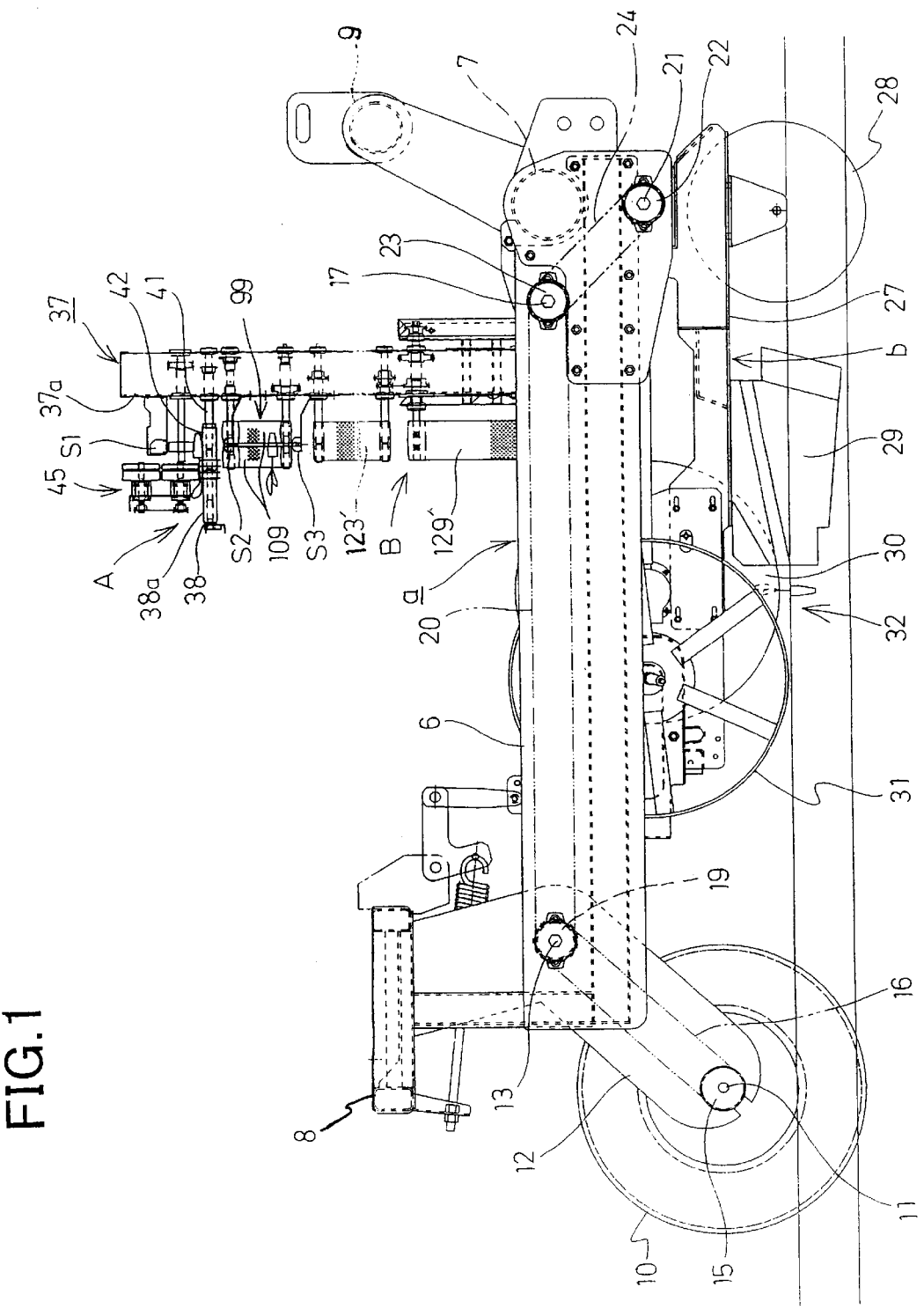
FIG. 1 is a side view of a transplanter equipped with a seedling-interval regulation apparatus of the present invention.

A transplanter equipped with a seedling-interval regulation apparatus according to an embodiment of the present invention will be described with reference to the drawings.

Reference character a denotes a machine frame. A shown in FIG. 4, the machine frame a includes side frames 6; a front frame 7 disposed transversely between and fixed to the front ends of the side frames 6; and a rear frame 8 disposed transversely between and fixed to the rear ends of the side frames 6. Thus, the machine frame a assumes a rectangular shape as viewed from above.

Reference numeral 9 denotes a coupling bracket projecting from a center portion of the front frame 7. The coupling bracket 9 is used for coupling the transplanter to a tractor.

Reference numeral 10 denotes each of drive wheels which are disposed symmetrically at opposite ends of the rear frame 8. The drive wheels 10 are rotatably supported, via axles 11, on brackets 12, which are fixed to the bottom surface of the rear frame 8.

A rear drive shaft 13 is extended between and rotatably supported by the rear end portions of the side frames 6. Roller chains 16 are extended between and wound around sprockets 14 fixed to the rear drive shaft 13 and sprockets 15 fixed to the inner end portions of the respective axles 11.

An intermediate drive shaft 17 is extended between and rotatably supported by the front end portion of one of the side frames 6 (the left-hand side frame 6 in FIGS. 3 and 4) and a bracket 7a disposed at an intermediate portion of the front frame 7. A sprocket 18 is fixed to one end of the intermediate drive shaft 17 to be located within the side frame 6; a sprocket 19 is fixed to one end of the rear drive shaft 13 to be located within the side frame 6; and a roller chain 20 is extended between and wound around the sprockets 18 and 19.

Reference numeral 21 denotes a front drive shaft which is disposed transversely and is suspended from the front frame 7 via brackets 7b. A sprocket 22 is fixed to one end of the front drive shaft 21 to be located on the outer side of the side frame 6; a sprocket 23 is fixed to one end of the intermediate drive shaft 17 to be located on the outer side of the side frame 6; and a roller chain 24 is extended between and wound around the sprockets 22 and 23.

Figure 3:
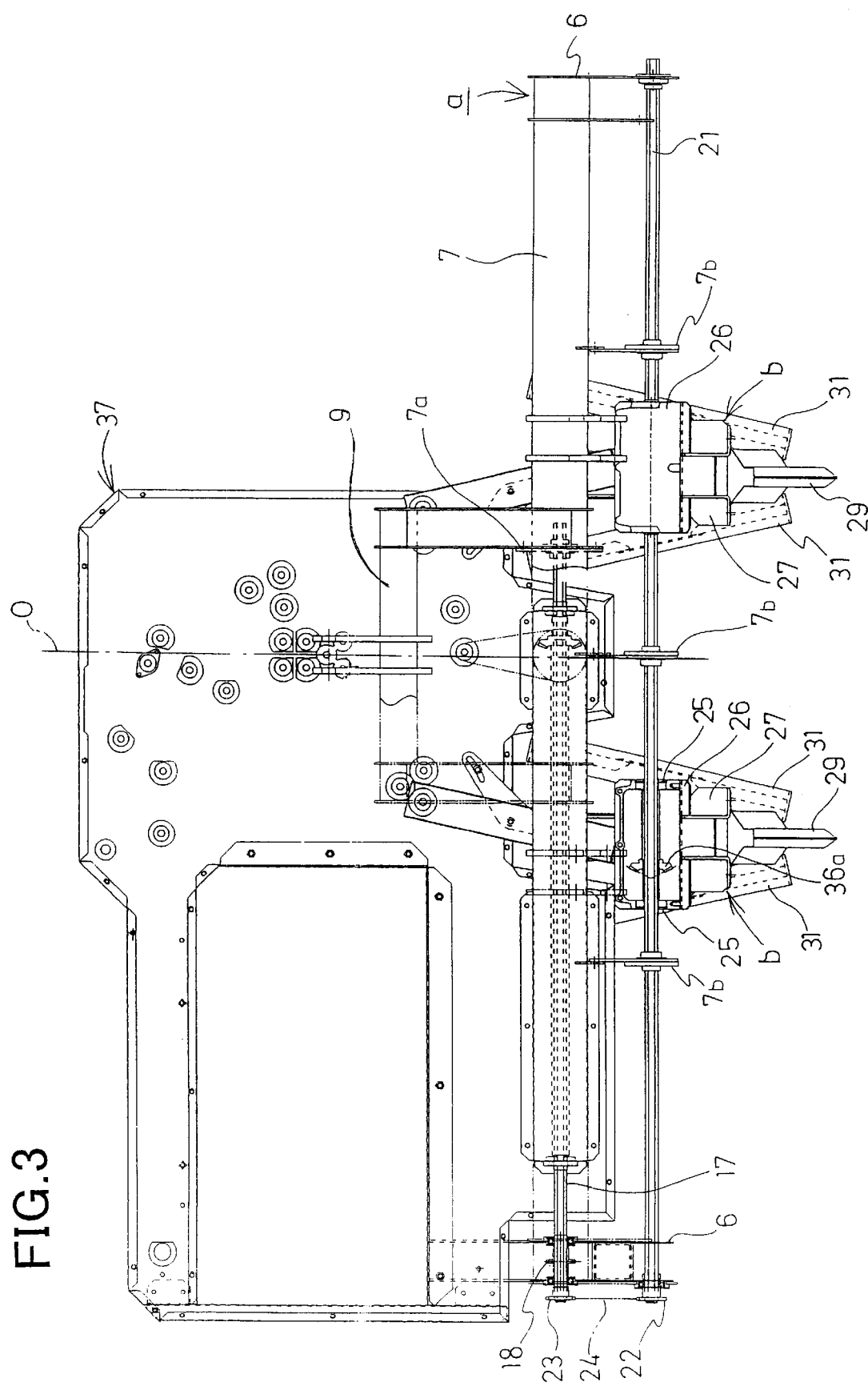
FIG. 3 is a partially sectioned front view of the transplanter.
Figure 4:
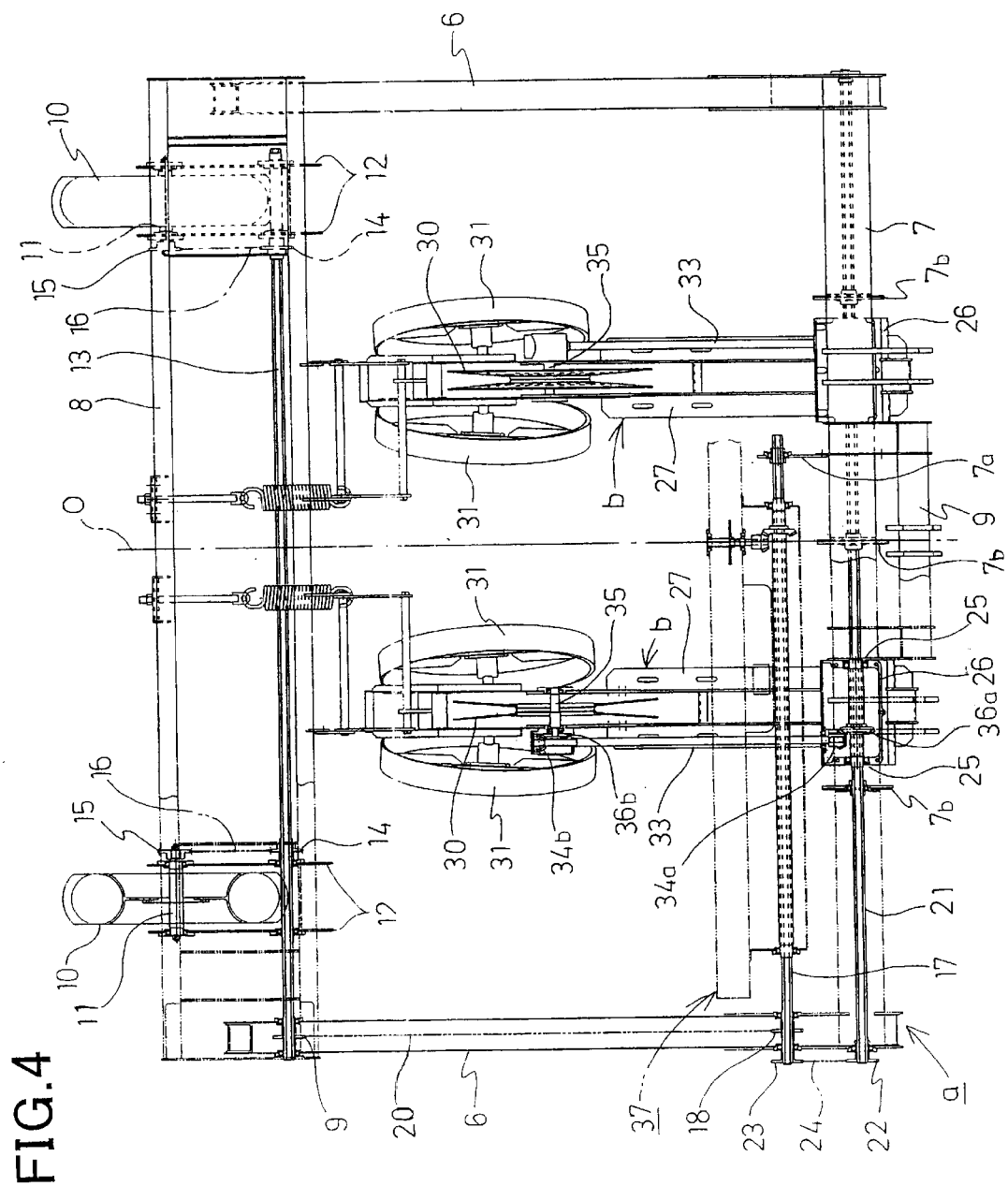
FIG. 4 is a partially sectioned plan view of the transplanter.

Reference character b denotes each of vertical swing frames disposed at symmetrical positions on opposite sides of the center line ○ of the machine frame a. As shown in FIGS. 3 and 4, each of the vertical swing frames b consists of a gear box 26 rotatably supported via bearings 25 (one of bearing pairs is not shown) and a mount frame 27, whose front end is fixed to the gear box 26 and which extends rearward from the gear box 26.

Figure 2:
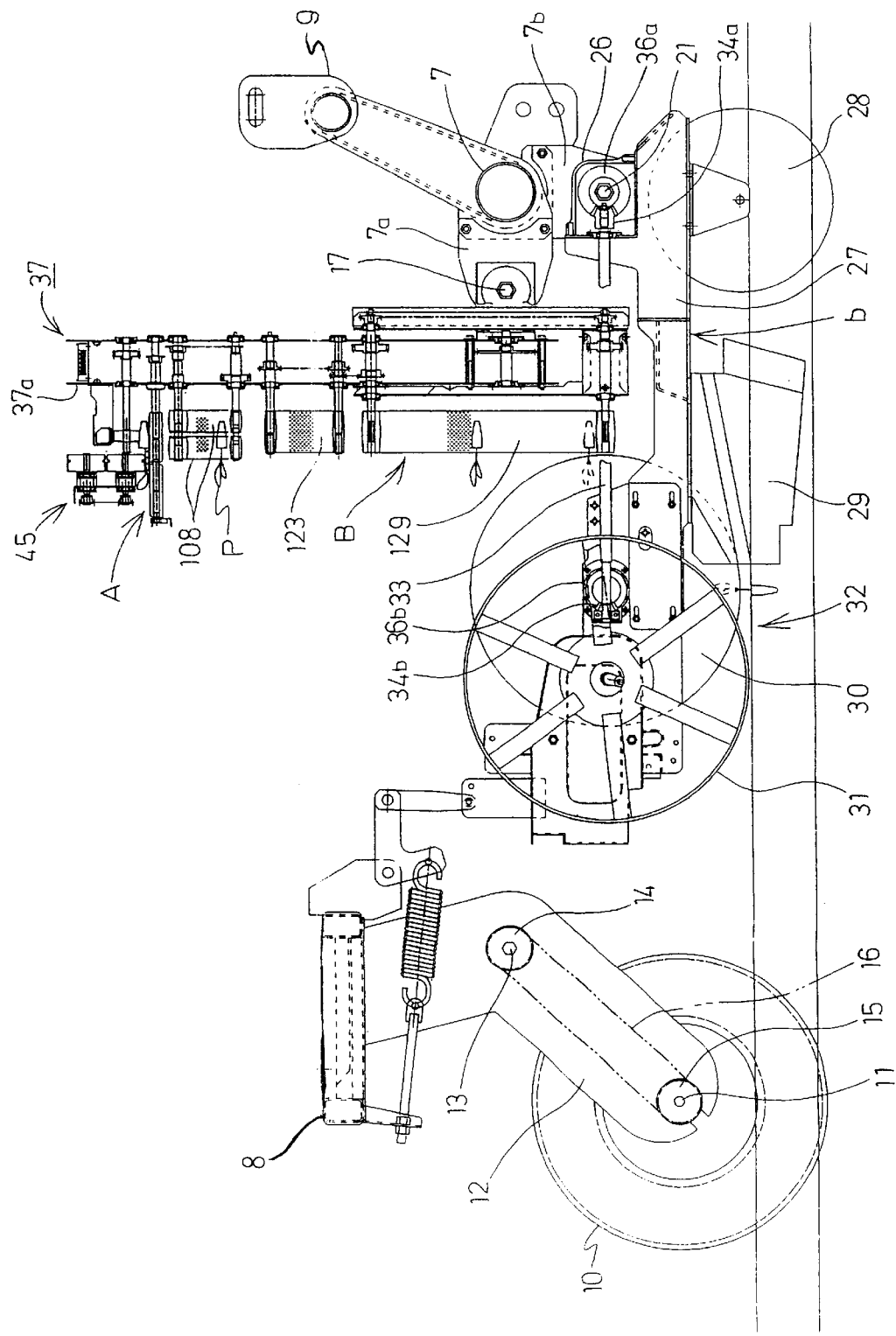
FIG. 2 is a vertically sectioned side view of the transplanter.

As shown in FIGS. 1 and 2, a planting mechanism 32 is disposed on each of the mount frames 27. The planting mechanism 32 includes a rolling colter 28, an opener 29, a planting wheel 30, and two land rollers 31, which are mounted on the mount frame 27 in this order from the front side to the rear side.

As shown in FIGS. 2 and 4, reference numeral 33 denotes connection shafts, each connection shaft 33 having a bevel gear 34a fixed to its front end portion and a bevel gear 34b fixed to its rear end portions. The bevel gear 34a is in meshing engagement with a bevel gear 36a disposed within the gear box 26 and fixed to the front drive shaft 21. The bevel gear 34b is in meshing engagement with a bevel gear 36b fixed to the outer end portion of an axle 35 of the planting wheel 30. (The bevel gears located on the right-hand side in FIG. 4 are not shown.)

As shown in FIG. 4, rotational drive force of the drive wheels 10 is transmitted to the intermediate drive shaft 17 via the sprockets 15, the roller chains 16, the rear drive shaft 13, the sprockets 18 and 19, and the roller chain 20. Further, rotational drive force of the intermediate drive shaft 17 is transmitted to the front drive shaft 21 via the sprockets 23 on the intermediate drive shaft 17, the roller chains 24, and the sprocket 22. Moreover, rotational drive force of the front drive shaft 21 is transmitted to the planting wheels 30 via the connection shafts 33.

Figure 5:
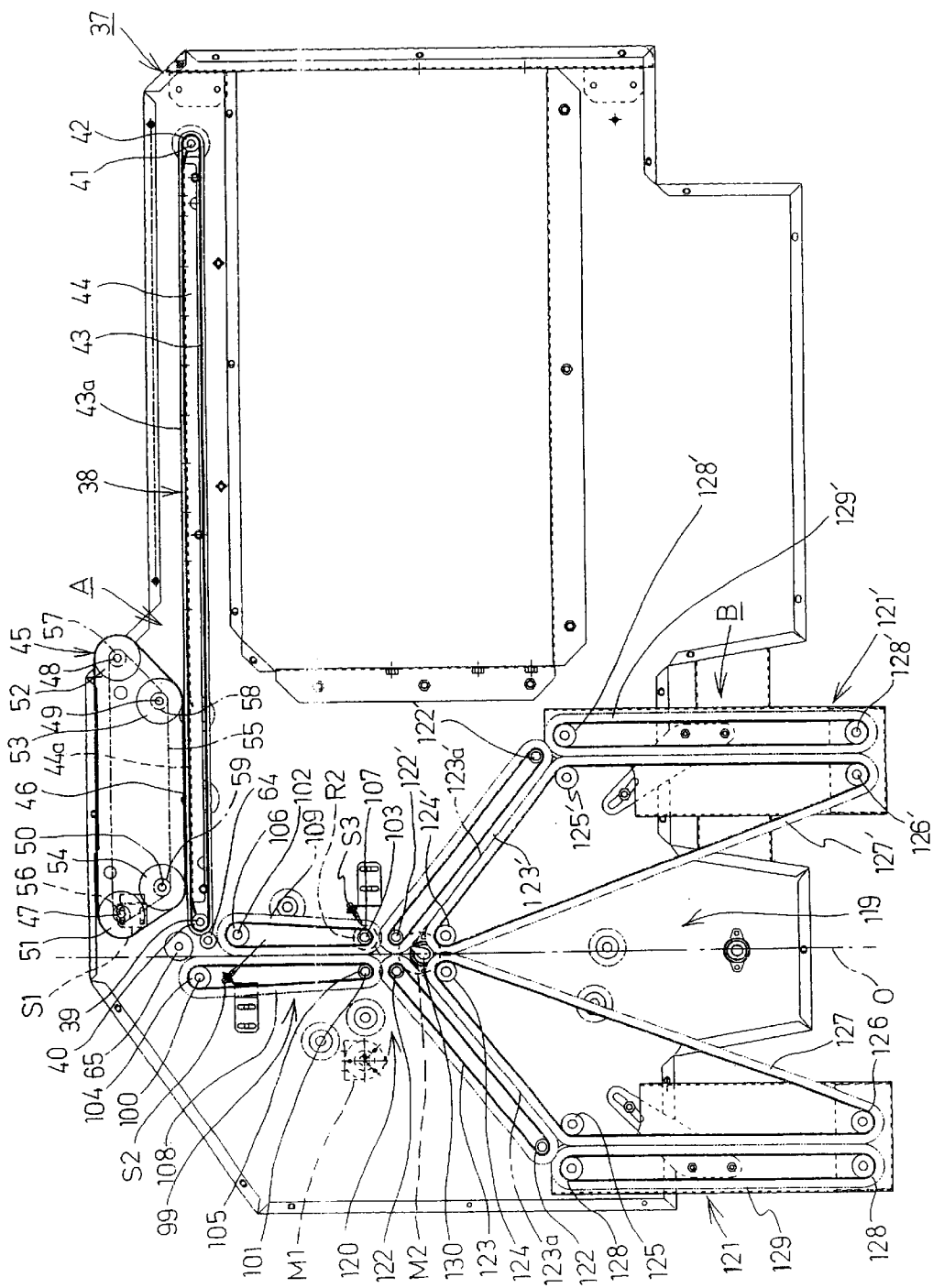
FIG. 5 is a rear view of the seedling-interval regulation apparatus of the present invention.

Reference numeral 37 denotes a seedling-interval regulation apparatus according to the present invention mounted on the machine frame a. As shown in FIG. 5, the seedling-interval regulation apparatus 37 includes a seedling selection/transport mechanism A and a transfer mechanism B, which are disposed integrally.

The seedling selection/transport mechanism A has the following structure.

Reference numeral 38 denotes a transport conveyer which consists of a belt support roller 40, a belt support roller 42, and a transport belt 43 formed of an elastic material such as rubber. The belt support roller 40 is attached to a shaft 39 disposed and supported at one end of a machine frame 37a of the seedling-interval regulation apparatus 37. The belt support roller 42 is attached to a shaft 41 disposed and supported at the other end of the machine frame 37a. The transport belt 43 is extended between and wound around the belt support rollers 40 and 42.

Reference numeral 44 denotes a belt supporter which is disposed between the belt support roller 40 and 42 in order to support an upper half 43a of the transport belt 43 from the lower side thereof, such that the upper half 43a is made flat.

Figure 6:
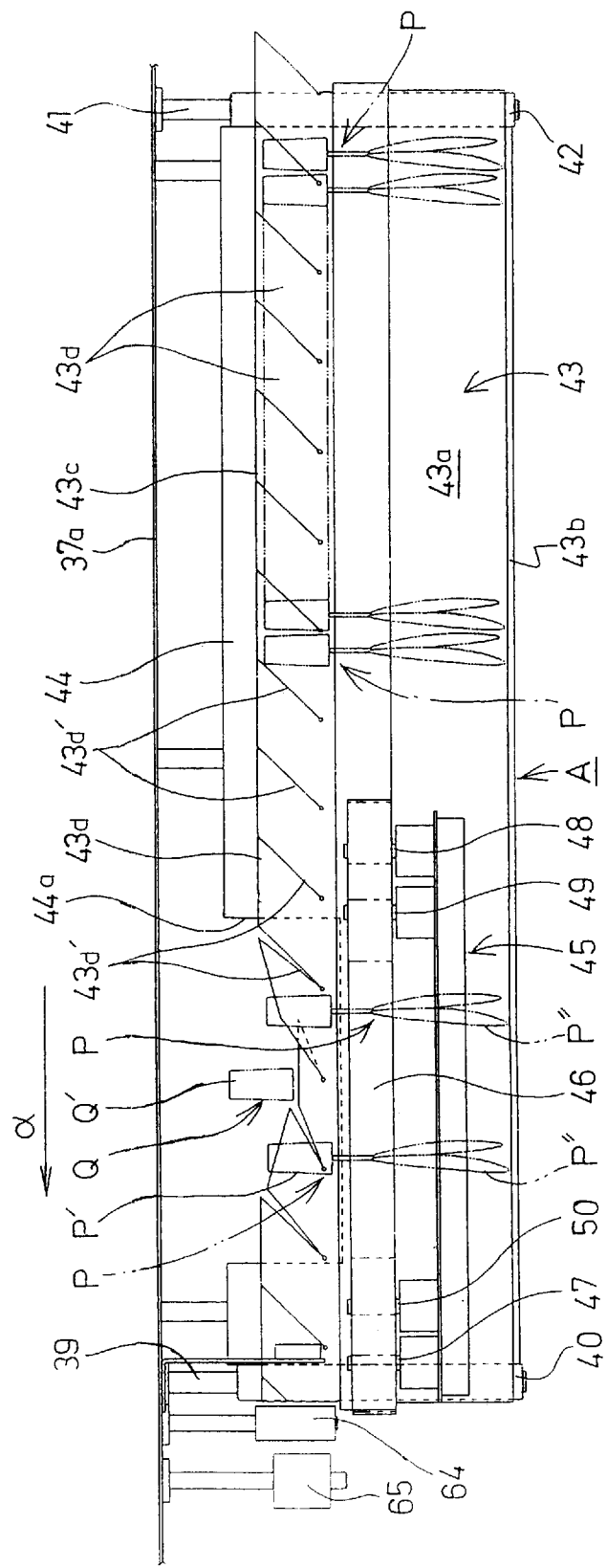
FIG. 6 is a plan view of the seedling selection/transport mechanism of the seedling-interval regulation apparatus.

As shown in FIG. 6, the transport belt 43 has opposite lateral side portions 43b and 43c, and cuts 4d' are formed at a predetermined interval in the side portion 43c. Thus, a plurality of seedling slip-down flaps 43d having a sufficient size to support a soil-encased portion P' of a good paper-tube seedling P and a soil-encased portion Q' of a defective paper-tube seedling Q.

The cuts 43d' are formed in an inclined manner such that the inner end of each cut 43d' is located in front of the outer end thereof with respect to the traveling direction α.

By virtue of the cuts 43d' formed in the above-described manner, when each seedling slip-down flap 43d travels along the circumferential surface of each of the belt support rollers 40 and 42, the seedling slip-down flap 43d deforms to gradually wind around the belt support roller 40 or 42 from the base end portion toward the outer end portion of an edge of the seedling slip-down flap 43d formed by the cut 43d'. Accordingly, even when a seedling feed roller 64, which will be described later, is disposed in the vicinity of the belt support roller 40, the transport belt 43 can travel smoothly without hitting the seedling feed roller 64.

The above-mentioned belt supporter 44 is a plate having a rectangular shape as viewed from above, and, as shown in FIG. 6, a seedling dropping opening 44a having a squarish-C shape is formed along one lateral edge of the belt supporter 44.

When each seedling slip-down flap 43d moves to a position corresponding to the seedling dropping opening 44a as a result of traveling of the transport belt 43, the seedling slip-down flap 43d gradually bends down into the seedling dropping opening 44a due to its weight, so that the seedling slip-down flap 43d assumes a downward-inclined posture.

As the seedling slip-down flap 43d passes through the seedling dropping opening 44a, the seedling slip-down flap 43d having bent down into the seedling dropping opening 44a is gradually restored to its original horizontal posture by means of support by the belt support 44.

The seedling slip-down flap 43d may be formed such that the seedling slip-down flap 43d does not bend due to its own weight but bends only when it carries a good paper-tube seedling P or a defective paper-tube seedling Q.

Reference numeral 45 denotes a nipping conveyer. As shown in FIGS. 5 to 8, the nipping conveyer 45 includes a leaf-portion nipping belt 46, and four belt support rollers 51 to 54. The belt support rollers 51 to 54 are attached to shafts 47 to 50 disposed at corners of a trapezoid (see FIG. 5) such that the leaf-portion nipping belt 46 nips only a leaf portion P" of a good paper-tube seedling P which has grown to proper length and such that the leaf-portion nipping belt 46 faces the upper half 43a of the transport belt 43.

Figure 7:
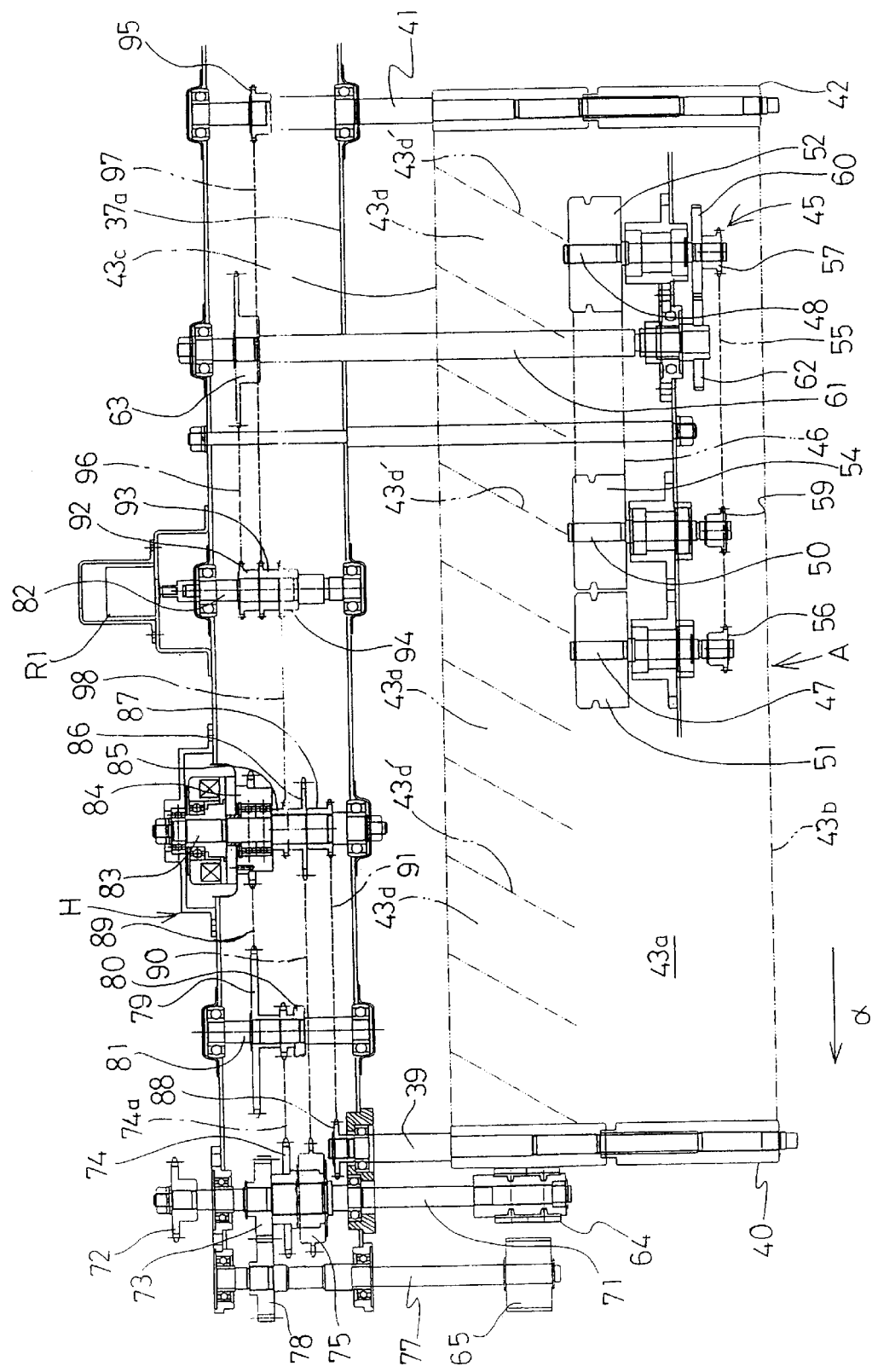
FIG. 7 is an explanatory view of a drive transmission system of the seedling selection/transport mechanism.
Figure 8:
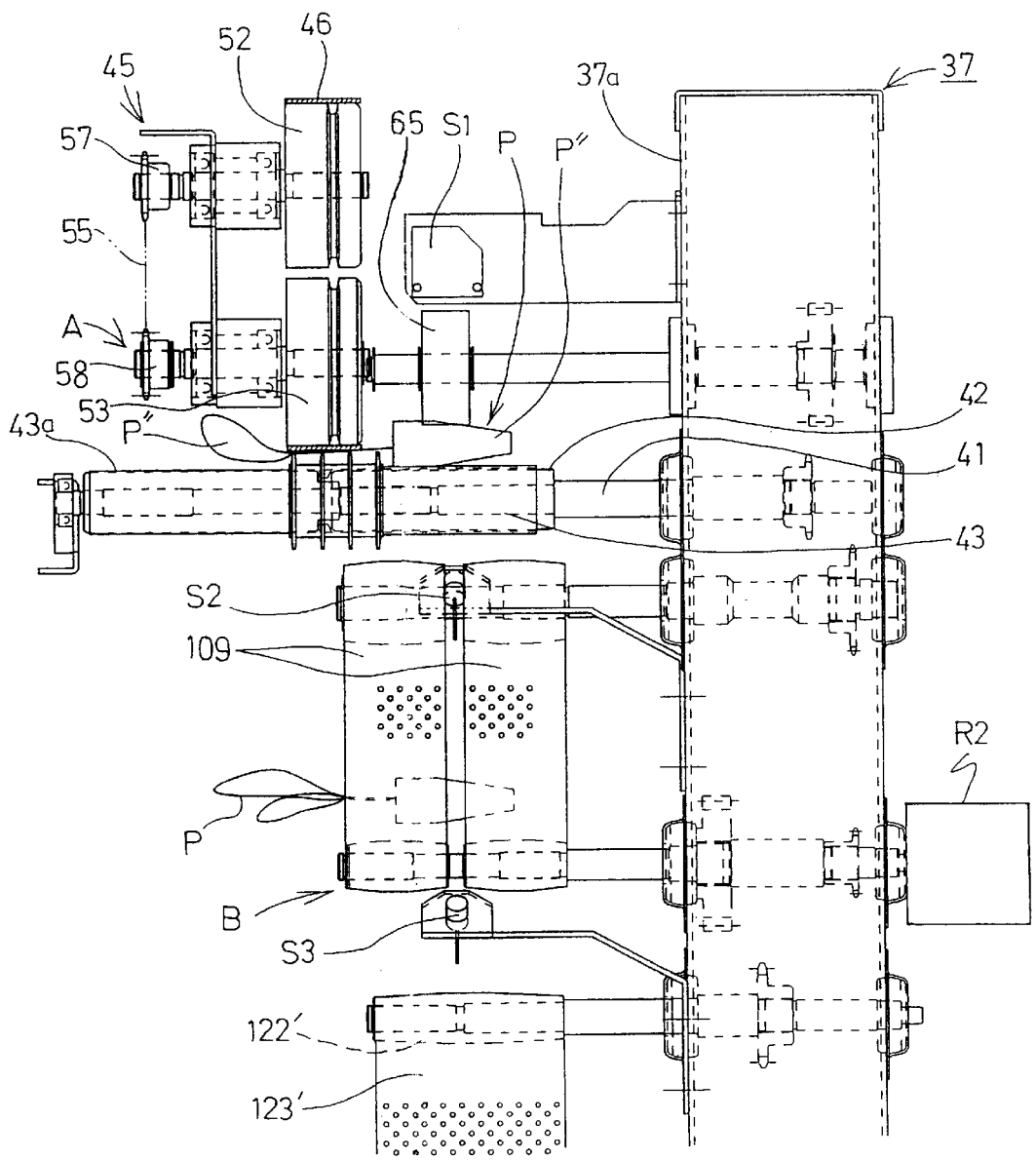
FIG. 8 is a side view of the drive transmission system of the transfer mechanism.

As shown in FIGS. 5 and 7, sprockets 56 to 59 are fixed to the base end portions of the shafts 47 to 50, respectively, and a roller chain 55 is wound around the sprockets 56 to 59. Further, a gear 60 is fixed to the shaft 48 together with the sprocket 57.

As shown in FIG. 7, reference numeral 61 denotes a connection shaft disposed in the vicinity of the shaft 48. A gear 62 in meshing engagement with the gear 60 is fixed to the tip end portion of the connection shaft 61, and a sprocket 63 is connected to the base end portion thereof.

By virtue of the above-described configuration, the leaf-portion nipping belt 46 of the nipping conveyer 45 travels synchronously with the transport belt 43 at the same traveling speed.

Transport operation of the seedling selection/transport mechanism A having the above-described structure will now be described.

As shown in FIG. 6, good paper-tube seedlings P or defective paper-tube seedlings Q supplied to the transport start end of the transport belt 43 are transported toward the transport completion end in a state in which their soil-encased portions p' and Q' are placed on the seedling slip-down flaps 43d provided at one lateral side portion 43c of the transport belt 43.

In the middle of transport, the leaf portion P'' of each good paper-tube seedling P is nipped between the leaf-portion nipping belt 46 of the nipping conveyer 45 and the transport belt 43 before the good paper-tube seedling P reaches the seedling dropping opening 44a, and the good paper-tube seedling P is transported while the nipped state is maintained.

By contrast, a defective paper-tube seedling Q whose leaf portion has not grown to a predetermined size is transported without its leaf portion being nipped by the leaf-portion nipping belt 46 of the nipping conveyer 45.

When each of the good and defective paper-tube seedlings P and Q arrives at an edge of the seedling dropping opening 44a, the corresponding seedling slip-down flap 43d starts bending downward due to its own weight and the weight of the soil-encased portion P' or Q' of the good or defective paper-tube seedling P or Q. Finally, the good or defective paper-tube seedling P or Q is apt to slip down along the seedling slip-down flap 43d from the soil-encased portion P' or Q' side.

However, since the leaf portion P'' of the good paper-tube seedling P is nipped by the leaf-portion nipping belt 46, the good paper-tube seedling P does not drop into the seedling dropping opening 44a and is transported to the transport completion end as the transport belt 43 travels.

By contrast, since the leaf portion of the defective paper-tube seedling Q is not nipped by the leaf-portion nipping belt 46, the defective paper-tube seedling Q slips down into the seedling dropping opening 44a due to the weight of the soil-encased portion Q', so that the defective paper-tube seedling Q is ejected to a path different from the transport path of the good paper-tube seedling P; i.e., is ejected outside the system. In this manner, good paper-tube seedlings P and defective paper-tube seedlings Q are sorted.

Reference character S1 denotes a seedling sensor for detecting the degree of tightness of good paper-tube seedlings P on the transport belt 43. As shown in, for example, FIG. 5, the sensor S1 is disposed at the transport completion end of the transport belt 43. More specifically, the sensor S1 detects whether a clearance is present on the upstream side of a good paper-tube seedling P to be transported into the space between the seedling feed roller 64 and a seedling holding roller 65; i.e., whether a following good paper-tube seedling P is located close to the good paper-tube seedling P.

The seedling feed 64 roller and the seedling holding roller 65 receive and guide good paper-tube seedlings P fed from the transport completion end of the transport belt 43 and supply them to the upper end portion of a variable speed conveyer 99 of the transfer mechanism B, which will be described later.

Figure 9:
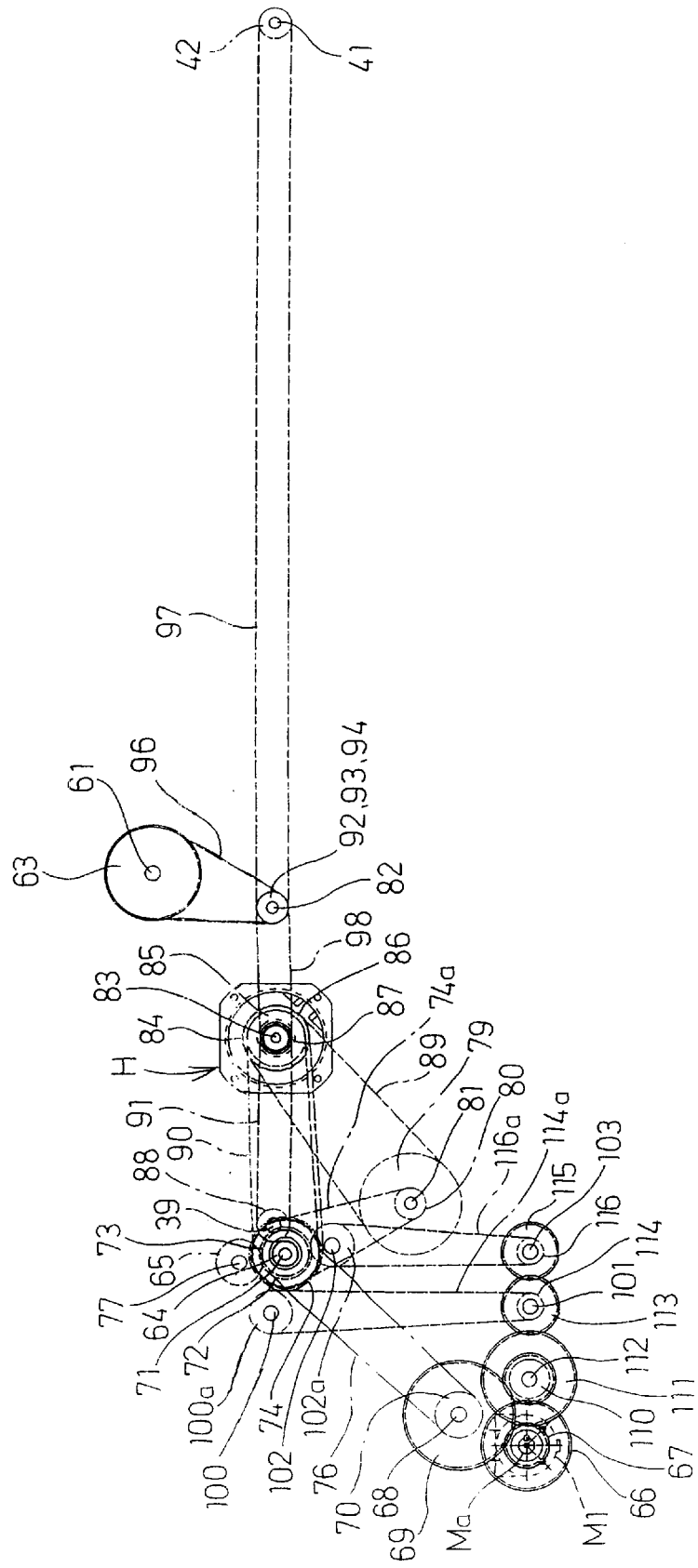
FIG. 9 is an explanatory view showing the drive transmission system of the transfer mechanism together with the drive transmission system of the seedling selection/transport mechanism.

As shown in FIG. 9, the above-described transport conveyer 38, nipping conveyer 45, seedling feed roller 64, and seedling holding roller 65 are rotated by means of a rotary-type actuator M1 such as a hydraulic motor or an electric motor, which serves a common drive source, via the following drive transmission system.

Large and small gears 66 and 67 are fixed to an output shaft Ma of the rotary-type actuator M1, and a gear 69 in meshing engagement with the small gear 67 and a sprocket 70 are fixed to an intermediate shaft 68 disposed in the vicinity of the rotary-type actuator M1.

As shown in FIG. 7, on a shaft 71 carrying the seedling feed roller 64 are disposed a sprocket 72, a gear 73, a sprocket 74, and a ratchet sprocket 75, in this sequence from the base end to the tip end. A roller chain 76 is extended between and wound around the sprocket 72 and the sprocket 70 on the above-mentioned intermediate shaft 68.

The gear 73 is in meshing engagement with a gear 78 fixed to a shaft 77 of the seedling holding roller 65. Thus, upon drive of the rotary actuator M1, the seedling feed roller 64 and the seedling holding roller 65 rotate in opposite directions at the same circumferential speed.

An intermediate shaft 81, to which large and small sprockets 79 and 80 are fixed, is disposed under the seedling holding roller 65. Further, an electromagnetic clutch H and an intermediate shaft 82 are disposed on one side of the seedling holding roller 65. The electromagnetic clutch H is turned on and off depending on the result of detection effected by the seedling sensor S1 as to whether or not a sufficient clearance is present between adjacent good paper-tube seedlings P.

As shown in FIG. 7, a clutch sprocket 84 and sprockets 85 to 87 are disposed on a shaft 83 of the electromagnetic clutch H, in this sequence from the base end to the tip end. The transmission of drive force between the shaft 83 and the clutch sprocket 84 is established or broken depending on the on/off state of the electromagnetic clutch H.

A roller chain 89 is extended between and wound around the clutch sprocket 84 and the sprocket 79 of the intermediate shaft 81. A roller chain 90 is extended between and wound around the sprocket 86 and the ratchet sprocket 75 of the seedling feed roller 64. A roller chain 91 is extended between and wound around the sprocket 87 and a sprocket 88 fixed to the shaft 39 of the belt support roller 40. Moreover, a roller chain 74a is extended between and wound around the sprocket 80 of the intermediate shaft 81 and the sprocket 74 of the shaft 71.

A measuring unit R1, such as a rotary encoder, and sprockets 92 to 94 are fixed to the intermediate shaft 82, in this sequence from the base end toward the tip end. A roller chain 96 is extended between and wound around the sprocket 92 and the sprocket 63 of the connection shaft 61. A roller chain 97 is extended between and wound around the sprocket 93 and a sprocket 95 fixed to the shaft 41. A roller chain 98 is extended between and wound around the sprocket 94 and the sprocket 85 of the electromagnetic clutch H.

In the transport conveyer 38 employing the transmission drive system having the above-described structure, the on/off state of the electromagnetic clutch H is switched depending on whether adjacent good paper-tube seedlings are transported in a state in which they are in close contact with each other, so that the traveling speed of the transport belt 43; i.e., the transport speed of good and defective paper-tube seedlings P and Q, changes between two speeds.

<Case in which good paper-tube seedlings are transported in close contact with each other>

In this case, since the seedling sensor S1 detects no clearance between adjacent good paper-tube seedlings P, the electromagnetic clutch H is turned off, so that the clutch sprocket 84 is not connected to the shaft 83. Accordingly, the drive force of the rotary-type actuator M1 is transmitted to the shaft 83 of the electromagnetic clutch H via the ratchet sprocket 75 of the shaft 71, the roller chain 90, and the sprocket 86. The drive force transmitted to the shaft 83 is further transmitted to the shaft 39 of the belt support roller 40 via the sprocket 87 of the shaft 83, the roller chain 91, and the sprocket 88.

When the drive force of the rotary-type actuator M1 is transmitted to the belt support roller 40 via the above-described power transmission path, the seedling feed roller 64 and the transport belt 43 of the transport conveyer 38 are driven such that their circumferential speeds become the same. The circumferential speed at this time is referred to as a regular speed.

<Case in which good paper-tube seedlings are not transported in close contact with each other>

In this case, since the seedling sensor S1 detects a clearance between adjacent good paper-tube seedlings P, the electromagnetic clutch H is turned on.

As a result, the drive force of the rotary-type actuator M1 is transmitted to the shaft 83 of the electromagnetic clutch H via the sprocket 74 of the shaft 71, the roller chain 74a, the sprockets 80, the shaft 81, the sprocket 79, the roller chain 89, and the clutch sprocket 84. The drive force transmitted to the shaft 83 is further transmitted to the shaft 39 of the belt support roller 40 via the sprocket 87 of the shaft 83, the roller chain 91, and the sprocket 88. Thus, the shaft 39 is rotated at a high speed as compared with the above-described case. Accordingly, the transport belt 43 travels at a circumferential speed greater than the regular speed.

The rotation of the shaft 83 of the electromagnetic clutch H is transmitted to the shaft 71 of the seedling feed roller 64 via the sprocket 86, the roller chain 90, and the ratchet sprocket 75 to thereby urge the shaft 71 to rotate faster than the regular speed. However, the speed difference is absorbed by the ratchet sprocket 75, which rotates with a speed difference relative to the shaft 71. Thus, rotation of the seedling feed roller 64 at the regular speed is maintained.

In other words, only the transport belt 43 and the leaf-portion nipping belt 46 are caused to travel at a speed greater than the regular speed, while the seedling feed roller 64 and the seedling holding roller 65 are maintained at the regular speed.

More specifically, the traveling distance of the transport belt 43 after the seedling sensor S1 has detected the clearance between good paper-tube seedlings P is detected by the measuring unit R1 fixed to the intermediate shaft 82, through operation of counting the number of pulses. When an clearance is detected before a preset number of pulses have been counted, a controller C, which will be described later, continues the driving at a desired circumferential speed greater than the regular speed. When a clearance is not detected before a preset number of pulses have been counted, the controller C controls the rotation of the rotary-type actuator M1 such that the traveling speed returns to the regular speed.

By virtue of the above-described operation, a good paper-tube seedling P which follows a good paper-tube seedling P detected by the seedling sensor S1 catches up with the later paper-tube seedling P, so that both the good paper-tube seedlings P come close to each other. That is, paper-tube seedlings P having come into close contact with each other are successively fed into the space between the seedling feed roller 64 and the seedling holding roller 65.

The transfer mechanism B has the following structure.

Figure 10:
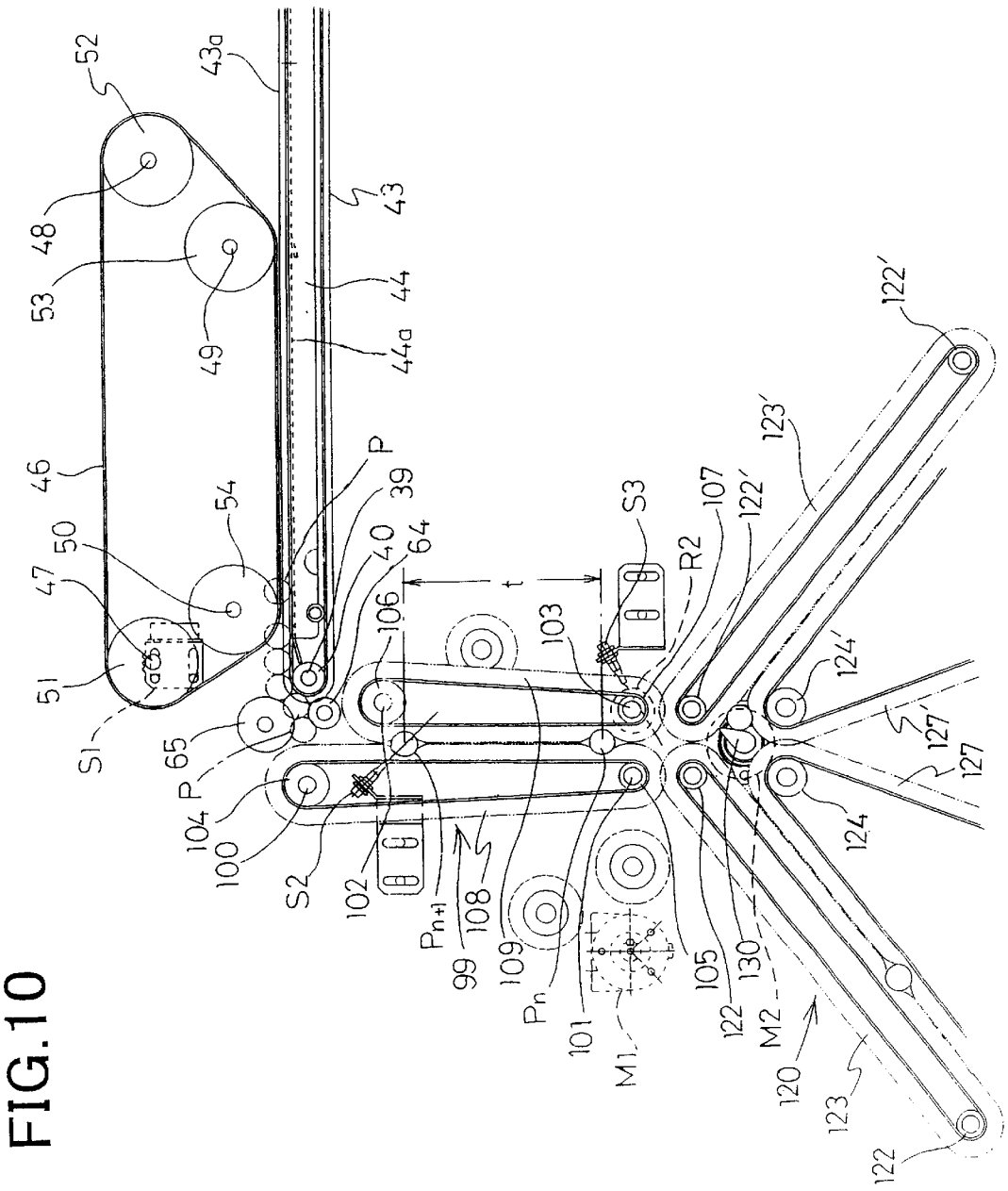
FIG. 10 is a partial rear view of the transfer mechanism showing the state of seedlings transported by the transfer mechanism, particularly showing the state in which two adjacent seedlings are transported by the variable speed conveyer.
Figure 11:
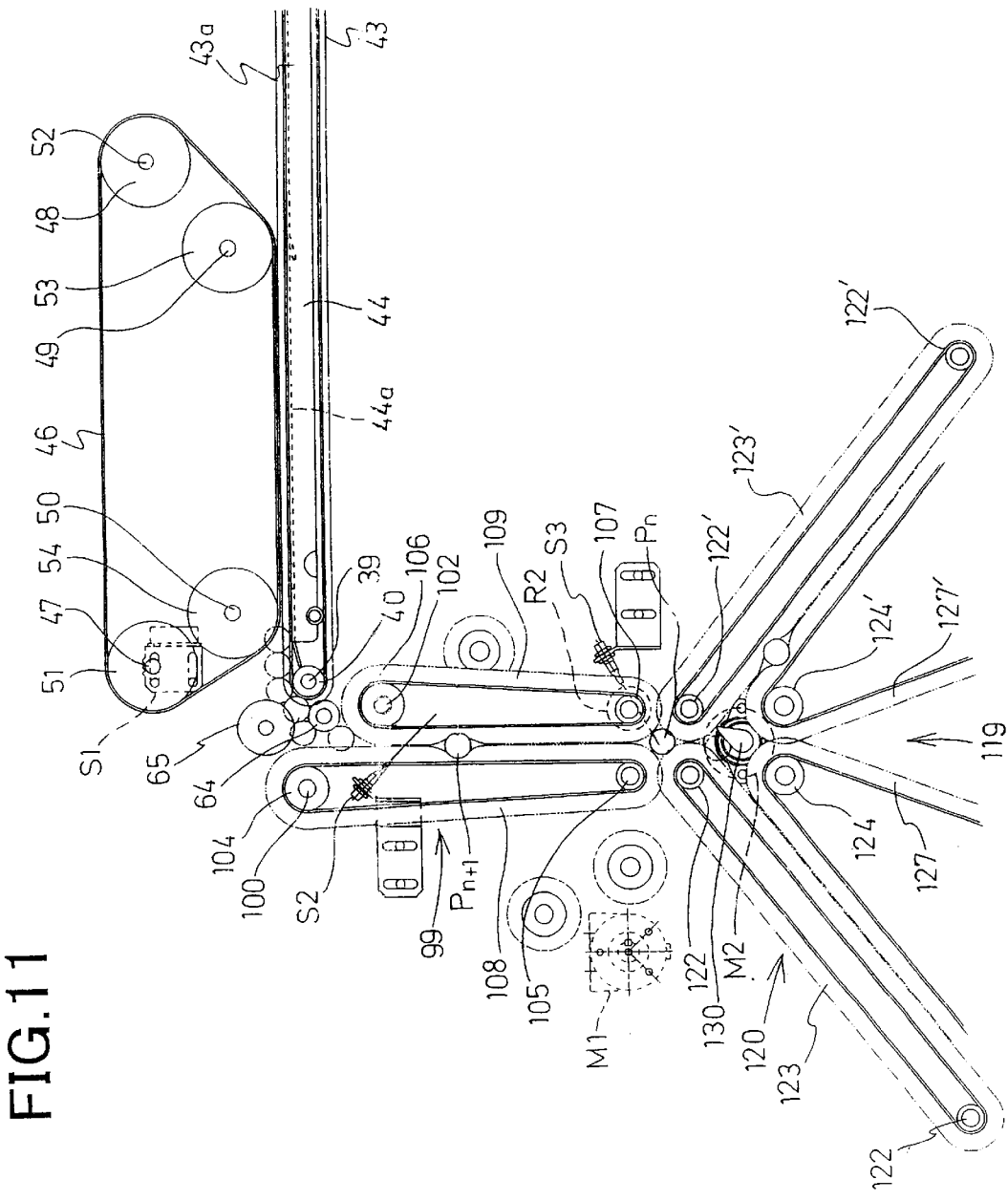
FIG. 11 is a partial rear view of the transfer mechanism showing the state of seedlings transported by the transfer mechanism, particularly showing the state immediately after the preceding seedling has been discharged from the variable speed conveyer.

Reference numeral 99 denotes a variable speed conveyer. As shown in FIGS. 5 and 10, the variable speed conveyer 99 includes a pair of nipping belts 108 and 109. The nipping belt 108 is extended between and wound around belt support rollers 104 and 105 rotatably attached to shafts 100 and 101 fixed to the frame 37a. The nipping belt 109 is extended between and wound around belt support rollers 106 and 107 rotatably attached to shafts 102 and 103 fixed to the frame 37a. The nipping belts 108 and 109 receive good paper-tube seedlings P discharged from the space between the seedling feed roller 64 and the seedling holding roller 65 and nips and transfers them for supply to the planting wheels 30.

The nipping belts 108 and 109 are disposed such that their upper end portions are located at positions in the vicinity of the transport completion end of the transport belt 43. When each good paper-tube seedling P received by the upper end portion of the nipping belt 108 is transported a short distance downward, the good paper-tube seedling P is nipped between the nipping belts 108 and 109 and is then transported toward the planting wheels 30 while being nipped.

Reference characters S2 and S3 each denote a seedling sensor for detecting each good paper-tube seedling P. The sensor S2 is disposed at the transport start end at which the sensor S2 can detect each seedling nipped between the nipping belts 108 and 109, whereas the sensor S3 is disposed at the transport completion end at which the sensor S3 can detect each seedling which is released from the nipping belts 108 and 109.

Reference character R2 denotes a measuring unit R2 such as a rotary encoder fixed to the shaft 103 of the belt support roller 107. The measuring unit R2 measures the traveling distance of the nipping belts 108 and 109.

The above-described variable speed conveyer 99 is rotated and driven, while the rotary-type actuator M1 is used as a drive source. Its drive transmission system is as follows.

An intermediate shaft 112 is rotatably disposed in the vicinity of the rotary-type actuator M1. A small gear 110 in meshing engagement with the large gear 66 is fixed to the intermediate shaft 112 together with a large gear 111.

A gear 113 in meshing engagement with the large gear 111 of the intermediate shaft 112 is fixed to the shaft 101 of the belt support roller 105, together with a sprocket 114. A sprocket 116 is fixed to the shaft 103 of the belt support roller 107 together with a gear 115 in meshing engagement with the gear 113 of the belt support roller 105.

A sprocket 100a is fixed to the shaft 100 of the belt support roller 104, and a sprocket 102a is fixed to the shaft 102 of the belt support roller 106. A roller chain 114a is extended between and wound around the sprocket 100a and the above-described sprocket 114, and a roller chain 116a is extended between and wound around the sprocket 102a and the above-described sprocket 116.

By virtue of the above structure, similar to the transport conveyer 38, the nipping belts 108 and 109 travel upon rotation of the rotary-type actuator M1 such that the nipping belts 108 and 109 can be accelerated, decelerated, and stopped.

Figure 12:
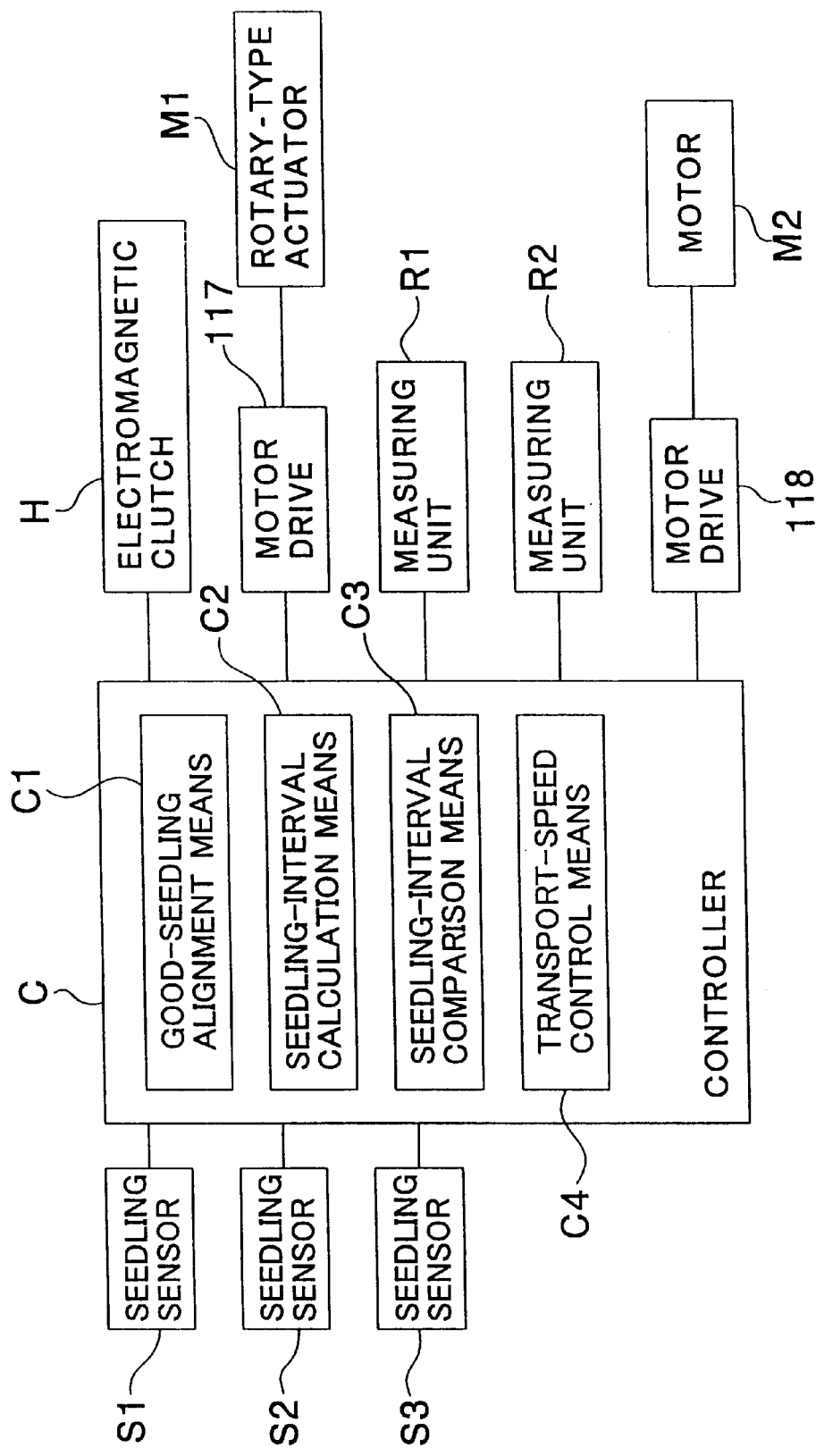
FIG. 12 is a block diagram showing the electrical system of the seedling-interval regulation apparatus of the present invention.

An electrical system of the seedling-interval regulation apparatus of the present invention will be described with reference to FIG. 12.

Reference character C denotes a controller for controlling the respective portions of the seedling-interval regulation apparatus of the present invention. The above-described seedling sensors S1 to S3 are connected to the input side of the controller C, and the electromagnetic clutch H, the rotary-type actuator M1, the measuring units R1 and R2, and a motor M2 for driving a distribution cam, which will be described later, are connected to the output side of the controller C. Reference numerals 117 and 118 denote motor drives.

The controller C has the following means.

(1) Good-seedling alignment means C1 for causing good paper-tube seedlings P that remain on the transport belt 43 without slipping down to come into close contact with each other.

Specifically, the good-seedling alignment means C1 increases the traveling speed of the transport conveyer 43 when a good paper-tube seedling P which follows a good paper-tube seedling P supplied to the seedling feed roller 64 disposed at the transport completion end of the transport conveyer 43 is not in close contact with the later seedling P.

More specifically, when the seedling sensor S1 disposed at the transport completion end of the transport conveyer 43 and adapted to detect successively-transported good paper-tube seedlings detects that a good paper-tube seedling P which follows a good paper-tube seedling P supplied to the seedling feed roller 64 disposed at the transport completion end of the transport conveyer 43 is not in close contact with the later seedling P, the good-seedling alignment means Cl turns on the electromagnetic clutch H. Thus, only the traveling speed of the transport belt 43 is increased, while the rotational speed of the seedling roller 64 is maintained.

If good paper-tube seedlings P are transferred to the variable speed conveyer 99 in a state in which they are not in close contact with each other, the transport speed of the variable speed conveyer 99 must be adjusted in an increased range. In other words, supplying good paper-tube seedlings P to the seedling feed roller 64 after causing them to come into close contact with each other can reduce the range in which the transport speed of the variable speed conveyer 99 is adjusted.

(2) Seedling-interval calculation means C2 for calculating the transport interval between two adjacent good paper-tube seedlings Pn and Pn+1 successively transported by the variable speed conveyer 99, by measuring a distance over which the preceding good paper-tube seedling Pn is transported between a point in time when the preceding good paper-tube seedling Pn is detected by the seedling sensor S2 and a point in time when the succeeding good paper-tube seedling Pn+1 is detected by the seedling sensor S2.

In the present embodiment, when the seedling sensor S2 detects the preceding good paper-tube seedling Pn, measurement of the transport distance by the measuring unit R2 is started. Subsequently, that measurement is stopped when the seedling sensor S2 detects the succeeding good paper-tube seedling Pn+1. On the basis of the number of pulses detected during this period, the corresponding traveling distance of the nipping belts 108 and 109; i.e., the transport interval t between the good paper-tube seedlings Pn and Pn+1, is calculated.

(3) Seedling-interval comparison means C3 for comparing the calculated transport interval t between the good paper-tube seedlings Pn and Pn+1 and a predetermined planting interval T.

(4) Transport-speed control means C4 for controlling the transport speed of the variable speed conveyer 99 on the basis of the comparison result. When as shown in FIG. 10 the calculated transport interval t coincides with the predetermined planting interval, the transport-speed control means C4 maintains the transport speed of the variable speed conveyer 99. When the calculated transport interval t does not coincide with the predetermined planting interval, the transport-speed control means C4 increases or decreases the transport speed of the variable speed conveyer 99 or stops the variable speed conveyer 99, such that the transport interval between two adjacent good paper-tube seedlings Pn and Pn+1 successively transported by the variable speed conveyer 99 becomes equal to the predetermined planting interval immediately after the preceding good paper-tube seedling Pn is discharged from the variable speed conveyer 99.

The timing at which each good paper-tube seedling P fed from the seedling feed roller 64 to the variable speed conveyer 99 varies depending on the diameter of the soil-encased portion P' and other factors, so that the interval between two adjacent good paper-tube seedlings Pn and Pn+1 increases and decreases greatly. In the case of seedlings, such as plug seedlings, which do not use paper tubes, this variation in seedling interval increases further depending on the water content and quality of soil surrounding each seedling, as well as the state of root wrapping.

In view of the foregoing, when the calculated transport interval t between two good paper-tube seedlings Pn and Pn+1 is greater than the predetermined planting interval, the transport-speed control means C4 increases the rotational speed of the rotary-type actuator M1 in order to increase the traveling speed of the nipping belts 108 and 109 such that the difference between the calculated transport interval t and the predetermined planting interval becomes zero. Thus, the transport interval between the two good paper-tube seedlings Pn and Pn+1 successively transported by the variable speed conveyer 99 is made equal to the predetermined planting interval.

When the calculated transport interval t between two good paper-tube seedlings Pn and Pn+1 is less than the predetermined planting interval, the transport-speed control means C4 decreases the rotational speed of the rotary-type actuator M1 in order to decrease the traveling speed of the nipping belts 108 and 109 such that such that the difference between the calculated transport interval t and the predetermined planting interval becomes zero. Thus, the transport interval between the two good paper-tube seedlings Pn and Pn+1 successively transported by the variable speed conveyer 99 becomes equal to the predetermined planting interval Further, when the calculated transport interval t between two good paper-tube seedlings Pn and Pn+1 is equal to the predetermined planting interval, the transport-speed control means C4 maintains the rotational speed of the rotary-type actuator M1 without increasing or decreasing it.

In the above-described embodiment, the judgment as to whether the preceding good paper-tube seedling Pn has been discharged from the seedling nipping belts 108 and 109 is made as follows. The transport distance of the preceding good paper-tube seedling Pn is measured from the time when the sensor S2 has detected the preceding good paper-tube seedling Pn, and when the measured transport distance exceeds the distance between the sensor S2 and the transport completion end of the seedling nipping conveyers 108 and 109, the preceding good paper-tube seedling Pn is judged to have been discharged from the seedling nipping belts 108 and 109. However, the judgment as to whether the preceding good paper-tube seedling Pn has been discharged from the seedling nipping belts 108 and 109 can be effected through detection of the preceding good paper-tube seedling Pn by use of, for example, a seedling sensor S3 for rotating a seedling distribution cam 130, which will be described later.

Reference numeral 119 denotes a seedling distribution mechanism. The seedling distribution mechanism 119 includes a distribution transfer mechanism 120 and supply transfer mechanisms 121 and 121'. The distribution transfer mechanism 120 distributes good paper-tube seedlings P discharged from the variable speed conveyer 99 to the left and right supply transfer mechanisms 121 and 121'. The supply transfer mechanisms 121 and 121' supply the distributed seedlings P to the planting wheels 30 of the plating mechanisms 32.

The distribution transfer mechanism 120 consists of an upper left belt 123 supported by two belt support rollers 122; an upper right belt 123' supported by two belt support rollers 122'; a lower left belt 127 supported by three belt support rollers 124 to 126; and a lower right belt 127' supported by three belt support rollers 124' to 126'. The supply transfer mechanism 121 consists of an outside left belt 129 supported by two belt support rollers 128 to be located on the outer side of the lower left belt 127; and an outside right belt 129' supported by two belt support rollers 128' to be located on the outer side of the lower right belt 127'.

The distribution transfer mechanism 120 and the supply transfer mechanisms 121 and 121' are rotated and driven by means of drive force of the drive wheels 10, which is transmitted thereto via gears and sprockets (not shown) fixed to the shafts of the respective belt support rollers.

Reference numeral 130 denotes the seedling distribution cam disposed between the upper ends of the upper left and right belts 123 and 123'. Each time the seedling sensor S3 detects a good paper-tube seedling P, the seedling distribution cam 130 is rotated leftward or rightward, alternately, by the motor M2, so that the good paper-tube seedlings P discharged from the nipping belts 108 and 109 are distributed alternately to a left transfer path 123a formed by means of the upper left belt 123, the lower left belt 127, and the outside left belt 129 and a right transfer path 123a' formed by means of the upper right belt 123', the lower right belt 127' and the outside right belt 129'.

The present invention is not limited to the above-described embodiment, and the following modified embodiment is possible.

Figure 13:
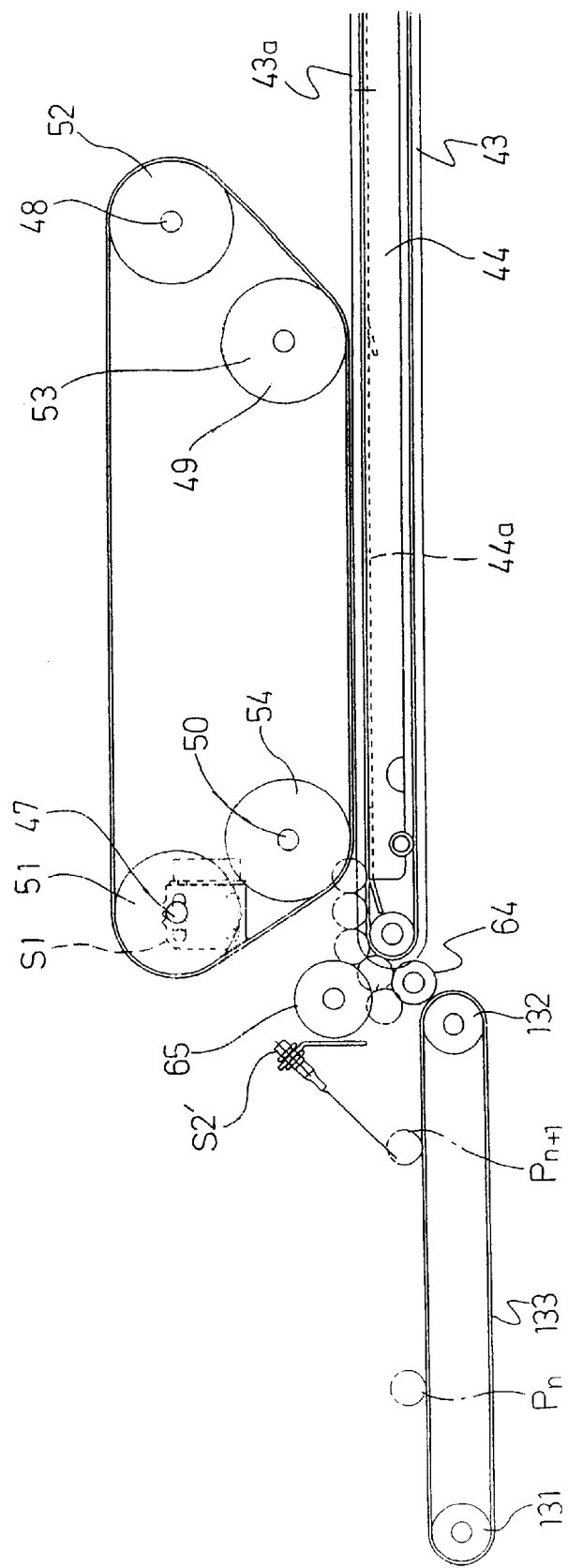
FIG. 13 is a schematic structural view showing a modified example of the variable speed conveyer.

In the above-described embodiment, the variable speed conveyer is constituted by a pair of nipping belts. However, as shown in FIG. 13, the variable speed conveyer may be constituted by a single reception belt 133 which is disposed between and wound around two belt support rollers 131 and 132 disposed at a desired interval and on which good paper-tube seedlings P are placed. Reference character S2' denotes a seedling sensor disposed at the transport start end of the reception belt 133 and adapted to detect good paper-tube seedlings Pn and Pn+1 placed on the reception belt 133.

Figure 14:
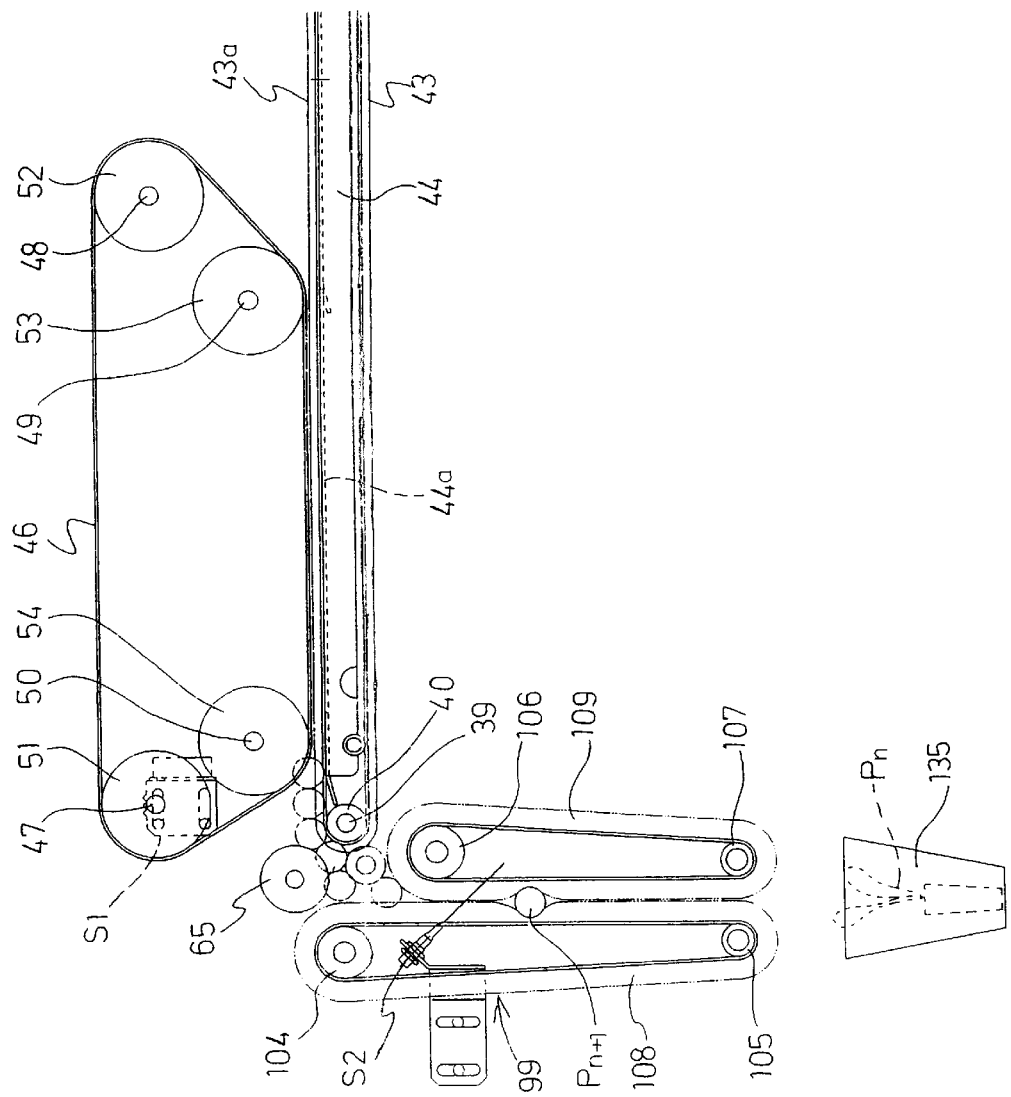
FIG. 14 is a schematic structural view showing a modified example of the transfer mechanism.
Figure 15:
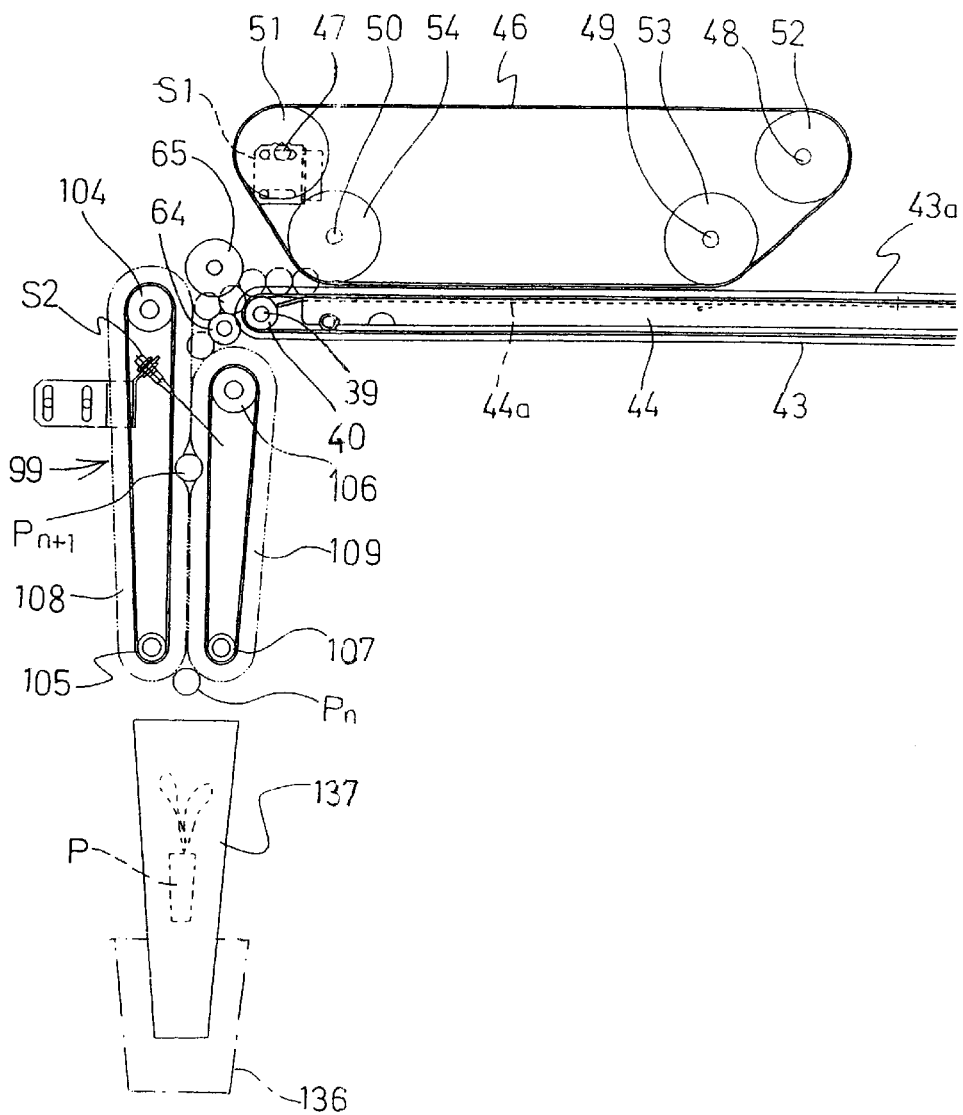
FIG. 15 is a schematic structural view showing another modified example of the transfer mechanism.
Figure 16:
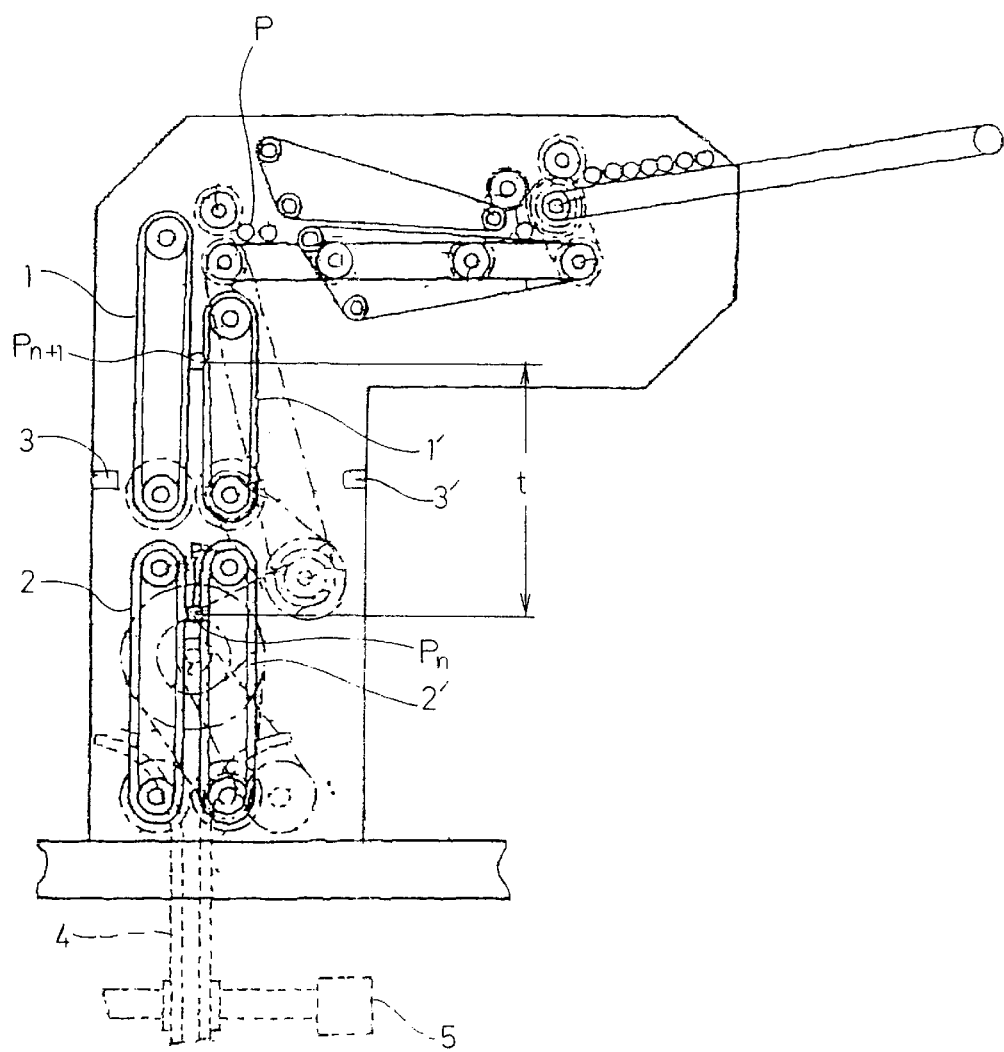
FIG. 16 is a rear view of a convention seedling-interval regulation apparatus.

In the above-described embodiment, the distribution transfer mechanism 120 is disposed on the downstream side of the variable speed conveyer 99. However, there may be employed a structure shown in FIG. 14 in which cups 135 for receiving discharged good paper-tube seedlings P are successively transported to a position to which good paper-tube seedlings P are discharged from the variable speed conveyer 99. Further, there may be employed a structure shown in FIG. 15 in which a shooter 137 for feeding good paper-tube seedlings P to the rear of an opener 136 is disposed at a position to which good paper-tube seedlings P are discharged from the variable speed conveyer 99.

Further, in the above-described embodiment, a seedling selection/transport mechanism is provided. However, the seedling selection/transport mechanism may be provided only when necessary.

In the above-described embodiment, paper-tube seedlings are used. However, the present invention can be applied to the case in which plug seedlings which do not use paper tubes are used.

In the above-described embodiment, the variable speed conveyer and the transport conveyer are driven by a common rotary-tyupe actuator. However, the variable speed conveyer and the transport conveyer may be driven by different rotary-type actuators.

Obviously, numerous modifications and variations of the present invention are possible in light of the above teachings. It is therefore to be understood that within the scope of the appended claims, the present invention may be practiced otherwise than as specifically described herein.

What is claimed is:

1. A seedling-interval regulation method comprising the steps of:

calculating the transport interval between two adjacent seedlings successively transported by a variable speed conveyer, by measuring a distance over which the preceding seedling is transported between a point in time when the preceding seedling is detected by a seedling sensor and a point in time when the succeeding seedling is detected by the seedling sensor;

comparing the calculated transport interval and a predetermined planting interval; and maintaining the transport speed of the variable speed conveyer when the calculated transport interval coincides with the predetermined planting interval, and increasing or decreasing the transport speed of the variable speed conveyer or stopping the variable speed conveyer when the calculated transport interval does not coincide with the predetermined planting interval, such that the transport interval between two adjacent seedlings successively transported by the variable speed conveyer becomes equal to the predetermined planting interval immediately after the preceding seedling is discharged from the variable speed conveyer.

2. A seedling-interval regulation method according to claim 1, wherein the variable speed conveyer is constituted by a pair of nipping belts, and each seedling is transported by the pair of nipping belts while being nipped between the pair of nipping belts.

3. A seedling-interval regulation method according to claim 1, wherein the variable speed conveyer is constituted by a reception belt, and each seedling is transported by the reception belt while being placed on the reception belt.

4. A seedling-interval regulation method according to claim 1, wherein the transport interval between two adjacent seedlings successively transported is calculated by measuring, by use of a measuring unit, a traveling distance of the variable speed conveyer between a point in time when the preceding seedling is detected by the seedling sensor and a point in time when the succeeding seedling is detected by the seedling sensor.

5. A seedling-interval regulation method according to claim 1, wherein good and defective seedlings are transported in a horizontal orientation by a transport belt; leaf portions of only the good seedlings are nipped between a leaf-portion nipping belt and the transport belt; one of opposite side portions of the transport belt is caused to bend downward to thereby cause only the defective seedlings whose leaf portions are not nipped by the leaf-portion nipping belt to slip down to the outside of a transport path, whereby only the good seedlings are fed toward the variable speed conveyer.

6. A seedling-interval regulation method according to claim 5, wherein the good seedlings remaining on the transport belt without slipping down are caused to come into close contact with each other.

7. A seedling-interval regulation method according to claim 6, wherein a seedling feed roller is disposed at a transport completion end of the transport belt; and when a good seedling which follows a good seedling fed to the seedling feed roller is not in close contact with the later seedling, only the traveling speed of the transport belt is increased while the rotational speed of the seedling feed roller is maintained.

8. A seedling-interval regulation method according to claim 5, wherein a plurality of seedling slip-down flaps formed at predetermined intervals along one side portion of the transport belt are caused to bend downward upon placement of the soil-encased portions of the good and defective seedlings thereon, whereby only the defective seedlings are caused to slip down to the outside of a transport path.

9. A seedling-interval regulation apparatus comprising:

a variable speed conveyer;

seedling-interval calculation means for calculating the transport interval between two adjacent seedlings successively transported by the variable speed conveyer, by measuring a distance over which the preceding seedling is transported between a point in time when the preceding seedling is detected by a seedling sensor and a point in time when the succeeding seedling is detected by the seedling sensor;

seedling-interval comparison means for comparing the calculated transport interval and a predetermined planting interval; and transport-speed control means for controlling the transport speed of the variable speed conveyer on the basis of the comparison result such that when the calculated transport interval coincides with the predetermined planting interval, the transport speed of the variable speed conveyer is maintained, and when the calculated transport interval does not coincide with the predetermined planting interval, the transport speed of the variable speed conveyer is increased or decreased or the variable speed conveyer is stopped, such that the transport interval between two adjacent seedlings successively transported by the variable speed conveyer becomes equal to the predetermined planting interval immediately after the preceding seedling is discharged from the variable speed conveyer.

10. A seedling-interval regulation apparatus according to claim 9, wherein the variable speed conveyer is constituted by a pair of nipping belts for transporting each seedling while nipping the seedling.

11. A seedling-interval regulation apparatus according to claim 9, wherein the variable speed conveyer is constituted by a reception belt for transporting each seedling placed on the reception belt.

12. A seedling-interval regulation apparatus according to claim 9, wherein a measuring unit for measuring a traveling distance of the variable speed conveyer is attached to the variable speed conveyer; the transport interval between two adjacent seedlings successively transported is calculated on the basis of a traveling distance of the variable speed conveyer measured by use of the measuring unit during a period between a point in time when the preceding seedling is detected by the seedling sensor and a point in time when the succeeding seedling is detected by the seedling sensor.

13. A seedling-interval regulation apparatus according to claim 9, wherein a seedling selection/transport mechanism comprising a transport conveyer and a nipping conveyer is disposed at a transport start end side of the variable speed conveyer; the transport conveyer includes a transport belt whose one side portion bends downward when the soil-encased portions of horizontally-oriented good and defective seedlings are eccentrically placed on the one side portion; and the nipping conveyer includes a leaf-portion nipping belt for nipping the leaf portions of the good seedlings in cooperation with the transport belt on which the good and defective seedlings are placed.

14. A seedling-interval regulation apparatus according to claim 13, further comprising good-seedling alignment means for bringing the good seedlings remaining on the transport belt without slipping down into close contact with each other.

15. A seedling-interval regulation apparatus according to claim 14, wherein when a good seedling which follows a good seedling fed to a seedling feed roller disposed at a transport completion end of the transport belt is not in close contact with the later seedling, the good-seedling alignment means increases only the traveling speed of the transport belt while maintaining the rotational speed of the seedling feed roller.

16. A seedling-interval regulation apparatus according to claim 13, wherein a plurality of seedling slip-down flaps are formed at predetermined intervals along one side portion of the transport belt such that the seedling slip-down flaps bend downward upon placement of the soil-encased portions of the good and defective seedlings thereon.

\* \* \* \* \*